United States Patent
Mulvaney

(10) Patent No.: US 9,218,440 B2
(45) Date of Patent: Dec. 22, 2015

(54) TIMING VERIFICATION OF AN INTEGRATED CIRCUIT

(71) Applicant: Brian J. Mulvaney, Austin, TX (US)

(72) Inventor: Brian J. Mulvaney, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 6 days.

(21) Appl. No.: 14/280,056

(22) Filed: May 16, 2014

(65) Prior Publication Data

US 2015/0331981 A1    Nov. 19, 2015

(51) Int. Cl.
   *G06F 17/50*    (2006.01)
(52) U.S. Cl.
   CPC ........ *G06F 17/5031* (2013.01); *G06F 17/5036* (2013.01); *G06F 17/5072* (2013.01); *G06F 17/5077* (2013.01)
(58) Field of Classification Search
   USPC ........................................................ 716/134
   See application file for complete search history.

(56) References Cited

U.S. PATENT DOCUMENTS

| 6,112,022 | A | 8/2000 | Wei | |
|---|---|---|---|---|
| 6,499,129 | B1 | 12/2002 | Srinivasan et al. | |
| 6,851,095 | B1 | 2/2005 | Srinivasan et al. | |
| 7,117,461 | B1 | 10/2006 | Srinivasan et al. | |
| 7,337,416 | B1 | 2/2008 | Srinivasan et al. | |
| 7,761,828 | B2 | 7/2010 | Miczo | |
| 8,326,591 | B1 * | 12/2012 | Cai et al. | 703/13 |
| 8,521,483 | B1 * | 8/2013 | Kukal et al. | 703/2 |
| 8,640,066 | B1 * | 1/2014 | Gupta et al. | 716/108 |
| 8,977,995 | B1 * | 3/2015 | Arora et al. | 716/105 |
| 9,152,742 | B1 * | 10/2015 | Gupta et al. | 716/108 |
| 2005/0273298 | A1 * | 12/2005 | Shah | 703/2 |
| 2008/0046851 | A1 * | 2/2008 | Miczo | 716/7 |
| 2008/0154571 | A1 * | 6/2008 | Arayama | 703/19 |
| 2009/0030665 | A1 * | 1/2009 | Kerns et al. | 703/14 |

* cited by examiner

*Primary Examiner* — Suchin Parihar
(74) *Attorney, Agent, or Firm* — VanLeeuwen & VanLeeuwen; Jonathan N. Geld

(57) ABSTRACT

This disclosure describes a design tool that verifies timing of an integrated circuit design by partitioning the integrated circuit design's gate-level netlist into target cell partition netlists and performs transistor-level circuit simulation on each target cell partition netlist. The design tool performs a back tracing procedure on each target sequential cell to define the target cell partition netlists. The design tool then identifies timing modes that enable valid logical paths through the target cell partition netlists from source sequential cells to the target sequential cells. In turn, the design tool performs transistor-level circuit simulation (e.g., SPICE simulations) on each target cell partition netlist to check for timing violations based upon the timing modes. In one embodiment, the design tool includes clock tree delay information, power supply variations, or routing parasitic information in the simulations to achieve improved timing analysis accuracy compared with traditional static timing analysis or timing optimization.

20 Claims, 12 Drawing Sheets

500 ⟶

| Timing Mode | Cell 310 Logic State | Cell 320 Logic State |
|---|---|---|
| 1 | 1 | 010 |
| 2 | 010 | 1 |

510 — (row 1)
520 — (row 2)

*FIG. 5*

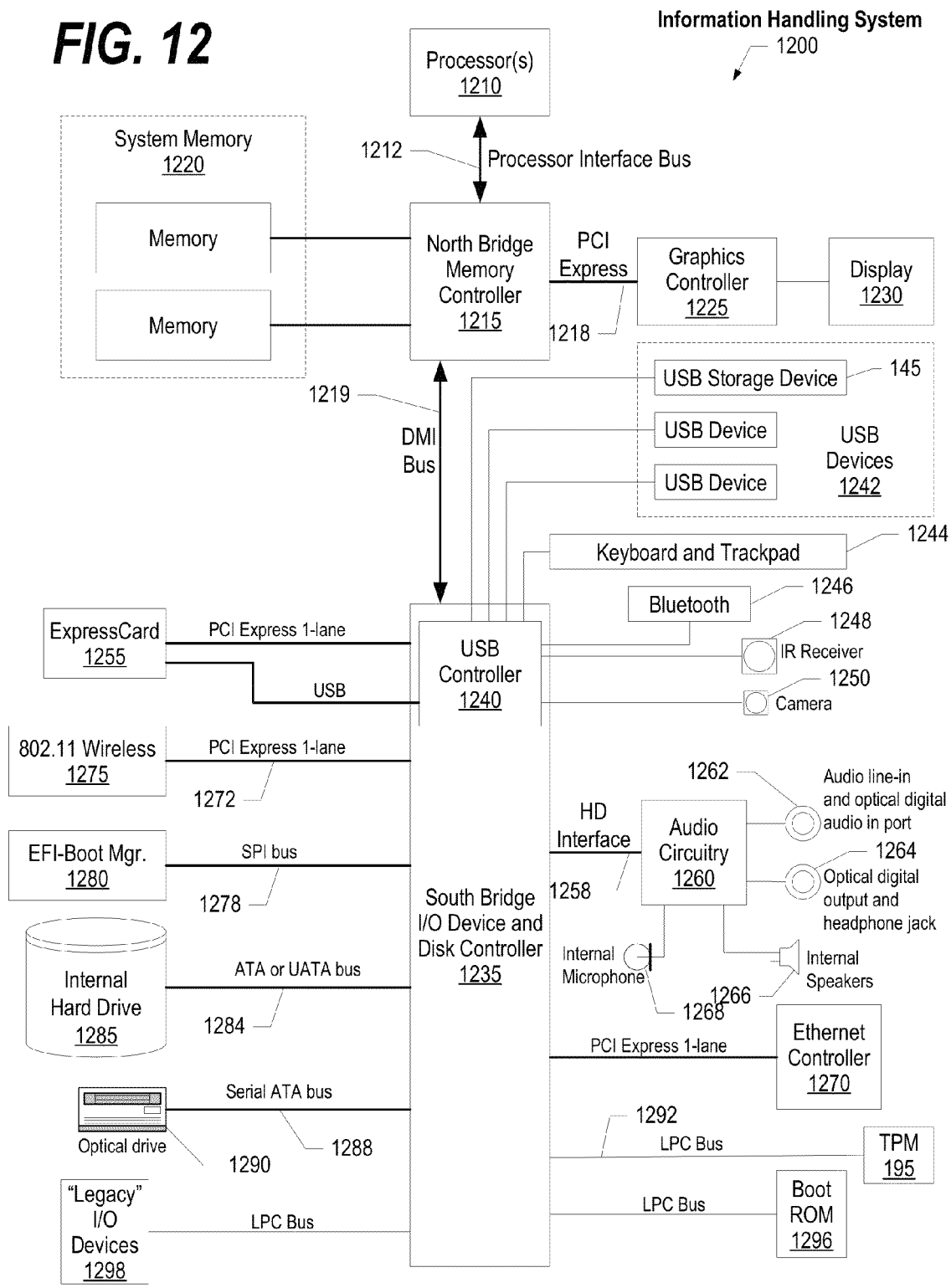

TIMING VERIFICATION OF AN INTEGRATED CIRCUIT

TECHNICAL FIELD

The present disclosure relates to verifying timing of an integrated circuit design by partitioning an integrated circuit gate-level netlist into target cell partition netlists and performing individual transistor-level circuit simulations on each of the target cell partition netlists.

BACKGROUND

Integrated circuit design involves the creation of electronic components, such as transistors, resistors, capacitors and the metallic interconnect of these components onto a piece of a semiconductor, such as silicon. A typical standard cell based integrated circuit design cycle involves multiple stages such as system specification, architectural design, functional/logic design, static timing analysis, physical design, timing optimization, and fabrication.

Traditional static timing analysis and timing optimization uses pre-characterized cell delay data of a standard cell library to verify timing of an integrated circuit design. Prior to the integrated circuit design, exhaustive SPICE (Simulation Program with Integrated Circuit Emphasis) simulations are performed for each standard cell based upon a matrix of various input data slew rates and output loads that mimic conditions that the cell may encounter during operation.

For standard cell technologies with transistor gate lengths greater than 1 um (micrometer), the overall circuit timing behavior is generally dominated by the delay through the standard cells. As such, traditional static timing analysis generally predicts an integrated circuit design's timing characteristics with acceptable accuracy. However, for technologies that have gate lengths less than 0.1 um, timing delays through interconnecting wires may be comparable to, or greater than, timing delays through the standard cells. Therefore, traditional static timing analysis for these technologies may result in inaccurate timing simulations or overly conservative timing optimizations.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 depicts an example of a timing mode table that includes timing modes of a target cell partition netlist;

FIG. 12 is a block diagram of a data processing system in which the methods described herein can be implemented.

DETAILED DESCRIPTION

A design tool is provided that verifies timing of an integrated circuit design by partitioning the integrated circuit design's gate-level netlist into individual target cell partition netlists, and executing independent transistor-level circuit simulations on each of the target cell partition netlists. The design tool defines each of the target cell partition netlists by locating a target sequential cell within the gate-level netlist and back tracing from the target sequential cell through combinational logic gates until reaching source sequential cells or other cells that produce a load on the back traced logic path between the source sequential cells and the target sequential cell. A target sequential cell or a source sequential cell may be a register, a latch, a flip-flop, or other type of standard cell that is capable of storing a data value.

Once the target cell partition netlists are defined, the design tool determines "timing modes" for each target cell partition netlist that enable logic paths from the source sequential cell to the target sequential cell such that a data transition on the source sequential cell produces a data transition on the target sequential cell. The design tool uses the timing modes to perform transistor-level circuit simulations (e.g., SPICE simulations) on the target cell partition netlists to check for timing violations. In one embodiment, the design tool inserts clock tree delay information, power supply variations, or routing parasitic properties in the target cell partition netlists to achieve improved timing analysis accuracy compared with traditional static timing analysis or timing optimization. In addition, the present approach alleviates a substantial amount of engineering hours to pre-characterize standard cell libraries and create 'liberty' files typically required by traditional static timing analysis approaches. If the transistor level-circuit simulations do not generate timing violations, the design tool generates mask layer data that is configured to create masks for construction of an integrated circuit.

Figure 1:
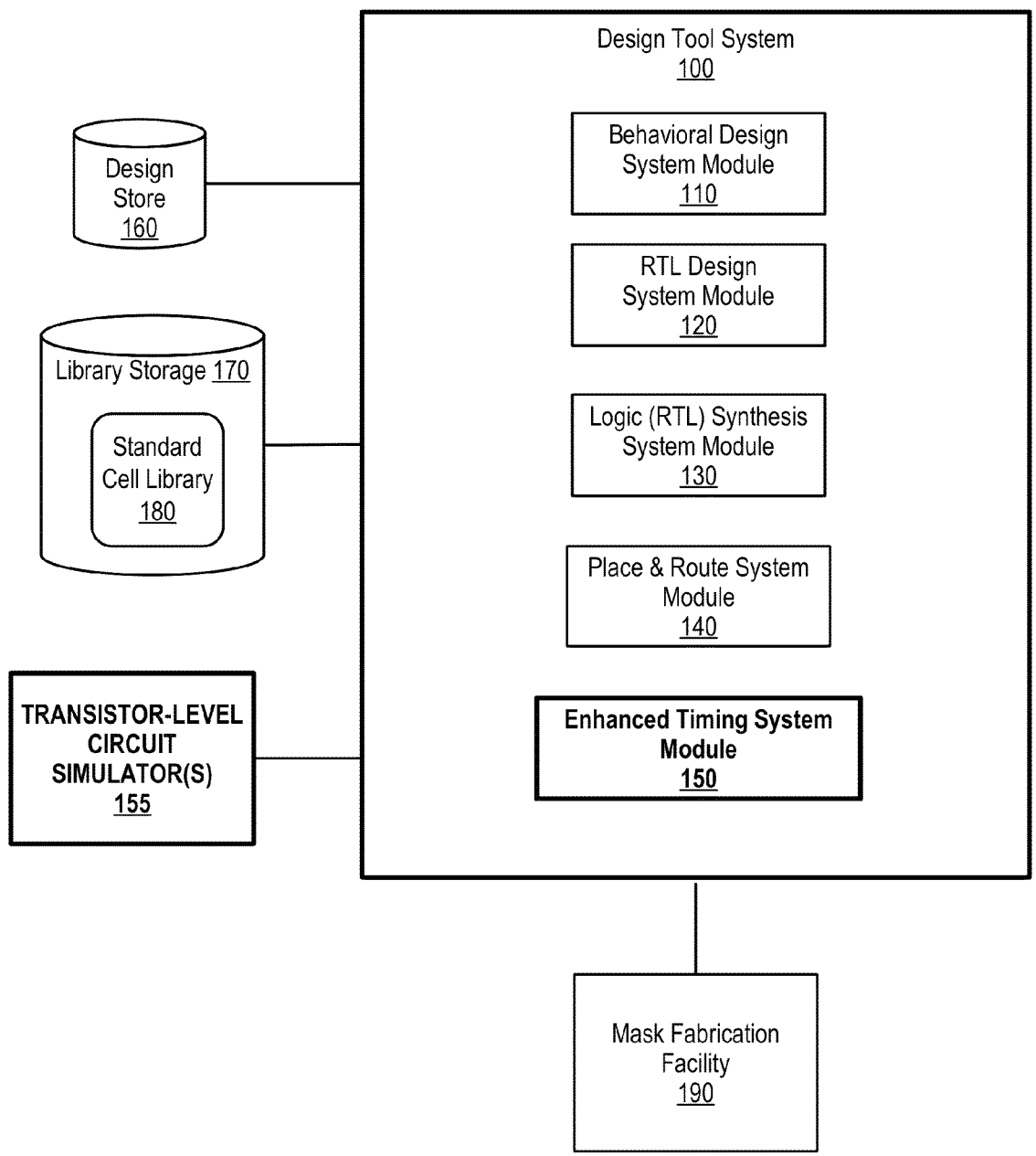
FIG. 1 is a diagram depicting one example of a design tool system that utilizes an enhanced timing system module to perform transistor-level circuit simulation during timing optimization of a standard cell design.

FIG. 1 is a diagram depicting one example of a design tool system that utilizes an enhanced timing system module to perform transistor-level circuit simulation during timing analysis or timing optimization of a standard cell design. Design tool system 100 includes system modules 110, 120, 130, 140, and 150 that execute steps in a standard cell design flow, such as an EDA (Electronic Design Automation) design flow. EDA utilizes a set of synthesis, verification, and test tools that check an integrated circuit system design, translate the corrected system design to a register-transfer level (RTL) description, and then proceed through synthesis and verification stages at the gate level to produce a physical design described in graphics data system II (GDSII) format, which a mask fabrication facility uses to generate masks configured to create the integrated circuit on a semiconductor wafer.

Behavioral design system module 110 generates behavioral design data based on an integrated circuit design specification located in design store 160. The behavioral design data includes, for example, behavioral algorithms or code that describes system behavior of the integrated circuit. RTL (register transfer level) design system module 120 transforms the behavioral design data into an RTL description that describes data flow at a register level on a per clock cycle basis. Logic synthesis system module 130 transforms the RTL description into a technology-dependent netlist based upon standard cell library 180 located in library store 170. The netlist includes standard cell instances (e.g., flip-flops, NAND gates, inverters, etc.) and port connection information that describes electrical connections between the standard cell instances.

Place and route system module 140 uses the netlist to place the standard cell instances on a design floorplan and "route" the design by placing interconnect wire objects on the design floor plan based upon the port connection information to connect the standard cell instances. A design floorplan of an integrated circuit is a schematic representation of tentative placements of major functional blocks (e.g., flip-flops, NAND gates, etc.). In turn, place and route system module 140 generates a physical gate-level netlist that includes timing delay information in the form of routing parasitic properties such as wire loading capacitances, wire loading resistances, fan out loading, etc.

In embodiments of the present invention, enhanced timing system module 150 locates target sequential cells in the gate-level netlist and proceeds through a series of steps to partition the overall gate-level netlist into multiple, standalone target cell partition netlists (see FIGS. 3-8 and corresponding text for further details). In one embodiment, enhanced timing system module 150 performs transistor-level circuit simulations on the individual target cell partition netlists. In another embodiment, enhanced timing system module 150 provides the target cell partition netlists to transistor-level circuit simulators 155 for simulations (e.g., a farm of SPICE simulators).

In one embodiment, enhanced timing system module 150, or transistor-level circuit simulators 155, performs the transistor-level circuit simulations prior to the completion of the design floorplan to determine whether the integrated circuit design causes timing violations prior to the place and route stage. In this embodiment, enhanced timing system module 150 re-simulates the target cell partition netlists after place and route steps to utilize routing parasitic properties corresponding to the interconnecting wires for improved timing accuracy.

Figure 11:
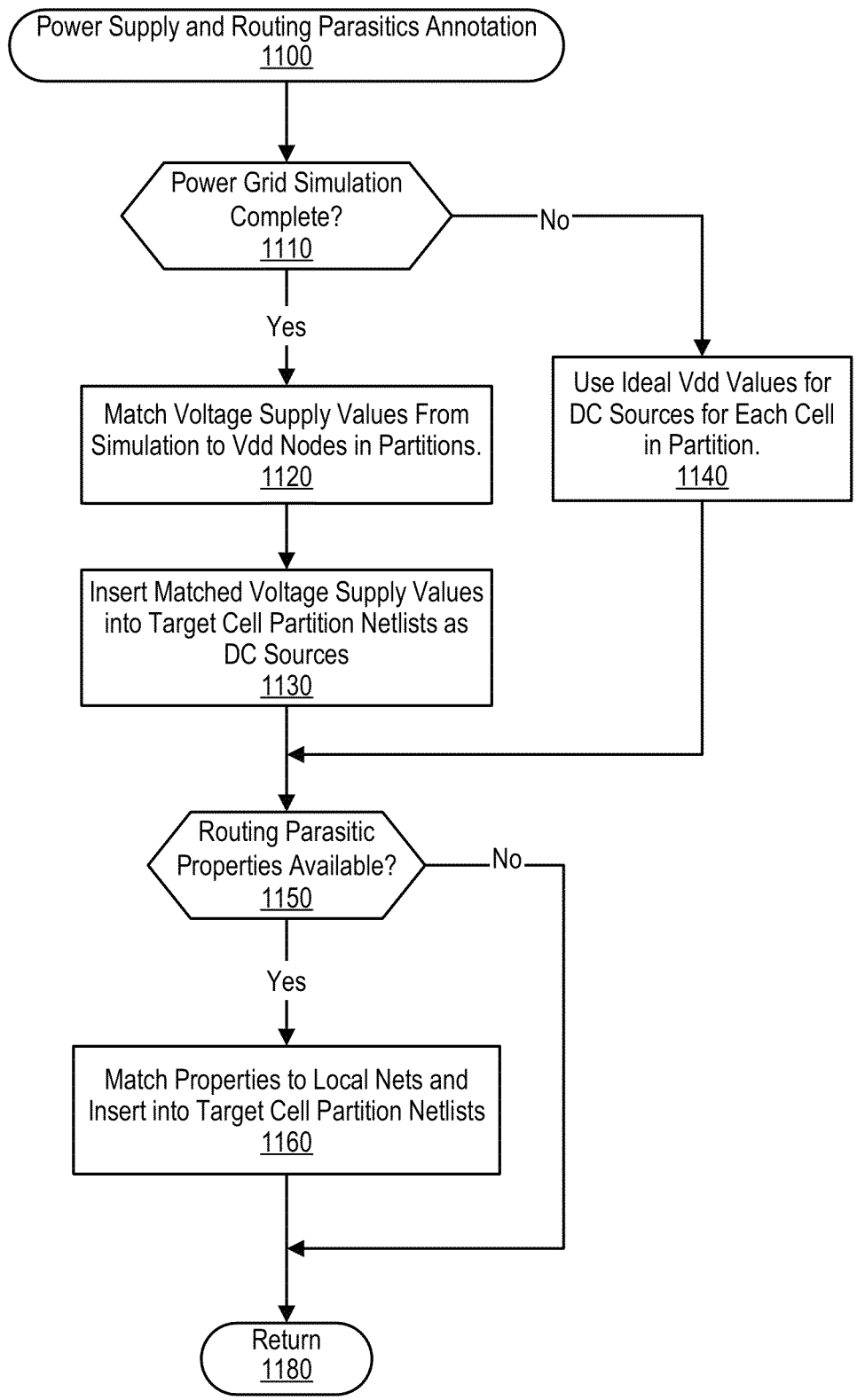
FIG. 11 is a flowchart depicting one example of steps taken by a design tool to insert accurate power supply voltages and routing parasitics into a target cell partition netlist.

In another embodiment, if a detailed power grid has been designed to supply power to the individual standard cell instances, enhanced timing system module 150 analyzes the power grid to determine resistive drops in voltages and compute actual voltage supply values provided to the individual standard cell instances (see FIG. 11 and corresponding text for further details).

If the timing simulations generate timing violations, design tool system 100 performs steps such as replacing cells, adding buffers, etc., to correct the timing violations. Once design tool system 100 resolves the timing violations, which may include recursive passes through various system modules discussed above, design tool system 100 creates mask layer data that includes information necessary to create wafer masks for production of an integrated circuit. Mask fabrication facility 190 receives the mask layer data and creates masks from the mask layer data that, in turn, a semiconductor facility uses to create an integrated circuit on a semiconductor wafer.

Figure 2:
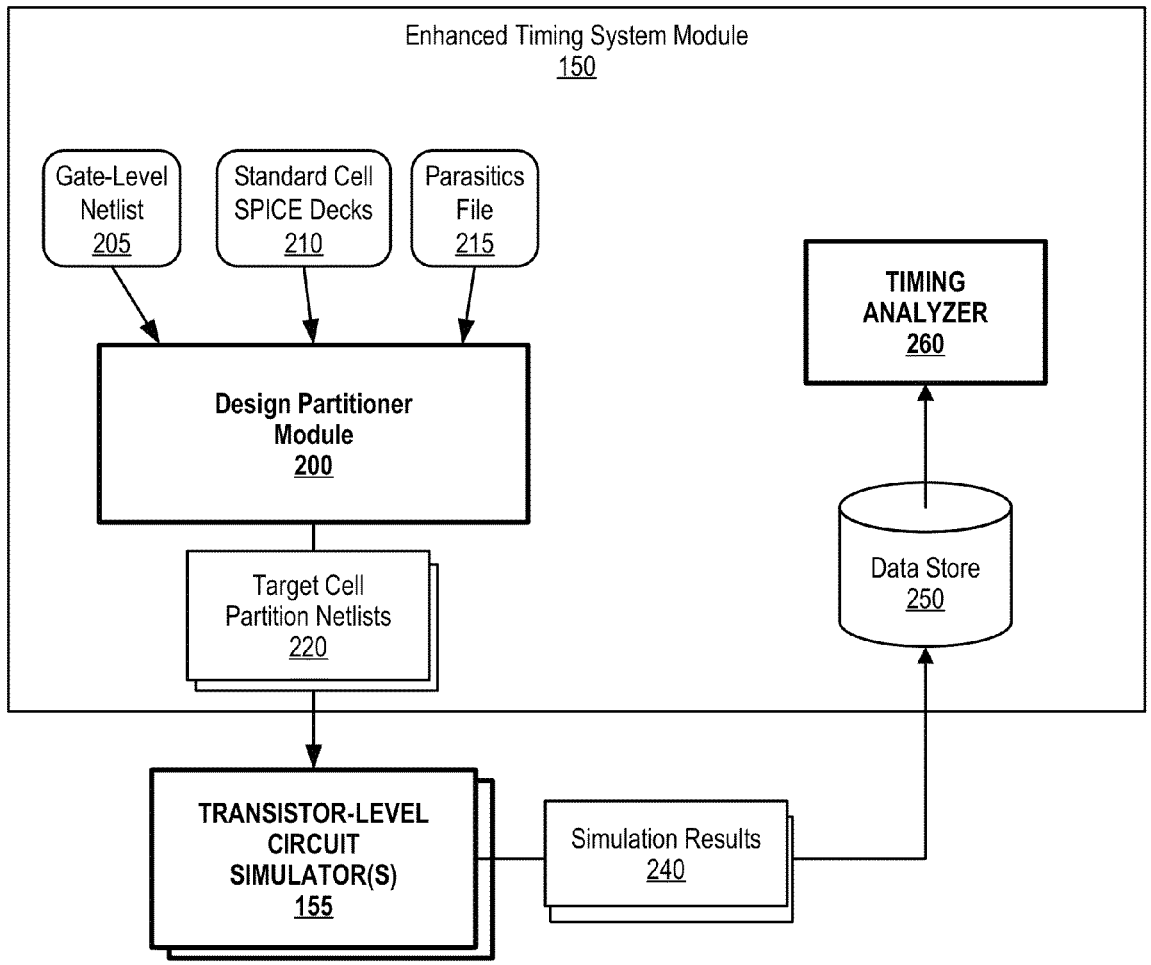
FIG. 2 is a diagram depicting one example of an enhanced timing system module partitioning a gate-level netlist into target cell partition netlists and performing individual SPICE simulations on each of the target cell partition netlists.

FIG. 2 is a diagram depicting one example of an enhanced timing system module that partitions a gate-level netlist into target cell partitions and sends the target cell partitions to transistor-level circuit simulators to execute simulations on each of the target cell partition netlists.

Enhanced timing system module 150 includes design partitioner module 200, which partitions gate-level netlist 205 into target cell partition netlists 220 (see FIGS. 3-4, 7-9, and corresponding text for further details). Design partitioner module 200 uses standard cell SPICE decks 210 to insert relevant information into each target cell partition. Standard cell SPICE decks 210 are a collection of the individual SPICE transistor-level netlists for each standard cell gates defined for a given technology, such as inverters, NAND gates, NOR gates, etc. as well as sequential SPICE netlists (e.g., registers, flip-flops, etc.). In one embodiment, design partitioner module 200 inserts routing parasitic properties from parasitics file 215 generated during the place and route stage into target cell partition netlists 220.

In another embodiment, target cell partition netlists 220 are stored in a relational database along with timing mode and clock waveforms. In this embodiment, if a standard cell instance belongs to multiple target cell partition netlists, the standard cell instance has a pointer that points to other corresponding partitions. For example, AND gate 335 in FIG. 3 belongs to cell 375's partition, cell 370's partition and cell 365's partition. As such, the relational database allows incremental updates to the simulations if a change is made to a standard cell instance utilized in any of the standard cell instance's corresponding target cell partition netlists.

Target cell partition netlists 220 are dispatched to transistor-level circuit simulators 155 and, in one embodiment, the simulations may be executed in parallel on multiple computer servers or multiple compute nodes. For example, transistor-level circuit simulators 155 may be SPICE simulators that compute detailed node voltages and branch currents as a function of time for each component, subject to Kirchoff's current law and Kirchoff's voltage law. In this example, by applying various measurements to the voltage and current waveforms, timing information may be simulated for the target cell partition netlists. The measured results (simulation results 240) generated by transistor-level circuit simulators 155 are stored in data store 250.

Timing analyzer 260 analyzes simulation results 240 and determines whether any timing violations were generated. If timing violations were generated, enhanced timing system module 150 informs design tool system 100 and design tool system takes appropriate actions, such as replacing cells, modifying clock trees, etc., and repeating the process as discussed herein until timing violations are resolved.

In one embodiment, crosstalk noise may adversely affect the timing behavior of an integrated circuit. Crosstalk noise is capacitive coupling onto a timing path, from other parts of the integrated circuit, which can cause glitches that adversely alter signals. To model the crosstalk noise, design partitioner module 200 locates coupling capacitors outside the target cell partition represented in routing parasitic properties stored in parasitics file 215. Then, for each node that couples into the target cell partition, a fast clock pulse signal is attached, such as 10 times the frequency of the normal clock. In this embodiment, transistor-level circuit simulators 155 re-simulate the target cell partition's timing modes in the presence of these "aggressor" signals and logs whether the timing results change.

In another embodiment, to simulate different operating conditions such as process corners, power, and temperature (PVT conditions), enhanced timing system module 150 selects the most marginal simulation results in data store 250 and re-simulates the corresponding target cell partition netlists under the various operating conditions.

In yet another embodiment, enhanced timing system module 150 re-simulates partial clock networks associated with target cell partitions using Monte Carlo analysis to vary the local and global variables. In this embodiment, enhanced timing system module 150 generates a statistical distribution of the relative clock skew (or phase shift) at each sequential cell in the target cell partition. In addition, enhanced timing system module 150 may also perform Monte Carlo analysis or sensitivity analysis on the data paths to determine sensitivities of a particular timing path to fluctuations in a manufacturing process.

Figure 3:
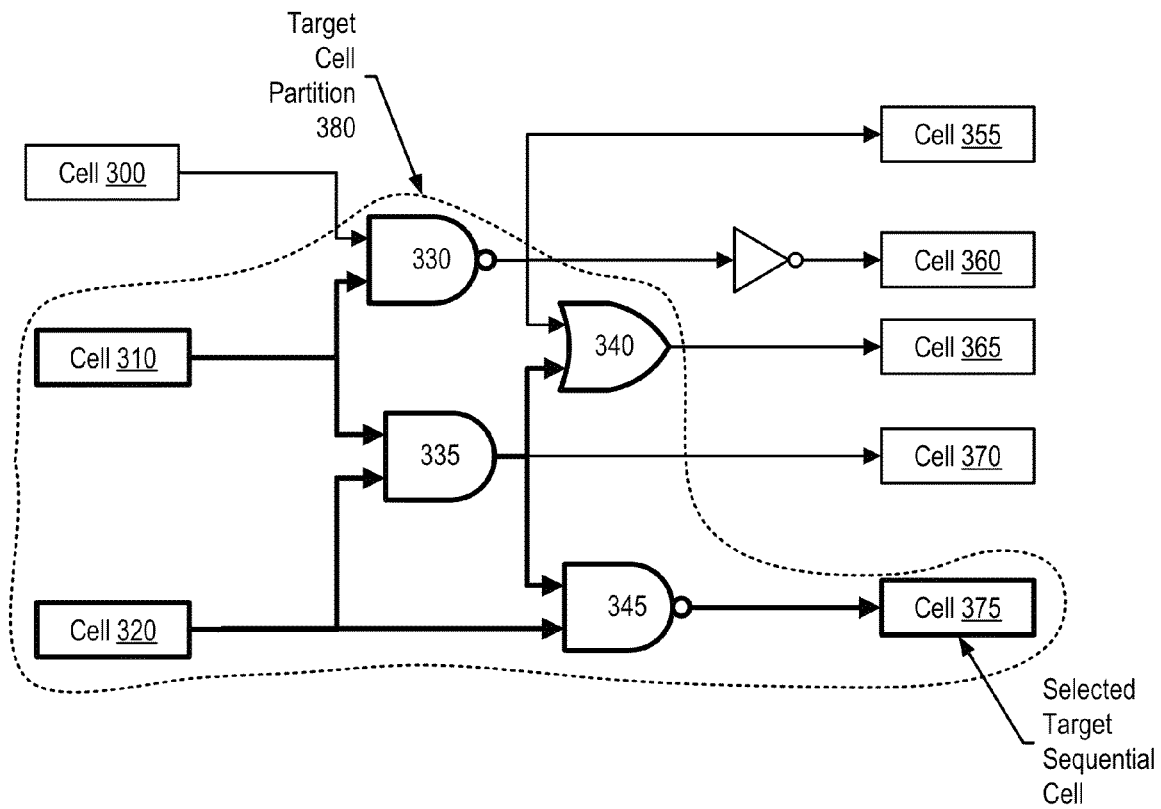
FIG. 3 is a diagram depicting one example of a design tool back tracing from a selected target sequential cell to define a target cell partition.

FIG. 3 is a diagram depicting one example of a design tool back tracing from a selected target sequential cell to define a target cell partition. The design tool may use a path tracing algorithm to define the target cell partition boundary, which identifies all components in the integrated circuit design that can affect the arrival of data at a specific target cell. The path tracing algorithm starts at the data input node of target cell 375, and identifies all gates which are also attached to this node. For each of these attached gates (345), the path tracing algorithm determines if the node is attached to an input of the gate or an output of the gate. If the node is attached to an input, then the gate becomes part of the target cell partition, but the path tracing does not continue any further through that gate. It is important to include such gates in the target cell partition because their inputs act as a load and affect the simulation results.

On the other hand, if the node is attached to an output of a gate, such as with gate 345, the path-tracing algorithm includes the gate in the partition, and adds the gate's input nodes to the back trace. The example in FIG. 3 shows that gate 345's input nodes couple to cell 320, gate 335, and gate 340. The path tracing algorithm continues tracing backwards along the various nodes until an input of a gate is reached, an output of another sequential is reached (source cell), or a primary input to the integrated circuit design (see FIG. 8 and corresponding text for further details). As a result, target cell partition 380 includes source cells 310 and 320, gates 330 through 345, and target cell 375.

Once target cell partitions are defined, the design tool proceeds through a series of steps to determine "timing modes" that allow source cell data transitions to affect target cell values. For example, in order for a data transition at source cell 320 to affect target cell 375's value, NAND gate 345's "upper" input must be high. Continuing with this example, in order for NAND gate 345's upper input to be high, source cell 310's value must be high. The design tool may use techniques such as digital gate-level simulation discussed in FIG. 4 below, or other approaches such as truth table analysis, binary decision diagrams, etc.

Figure 4:
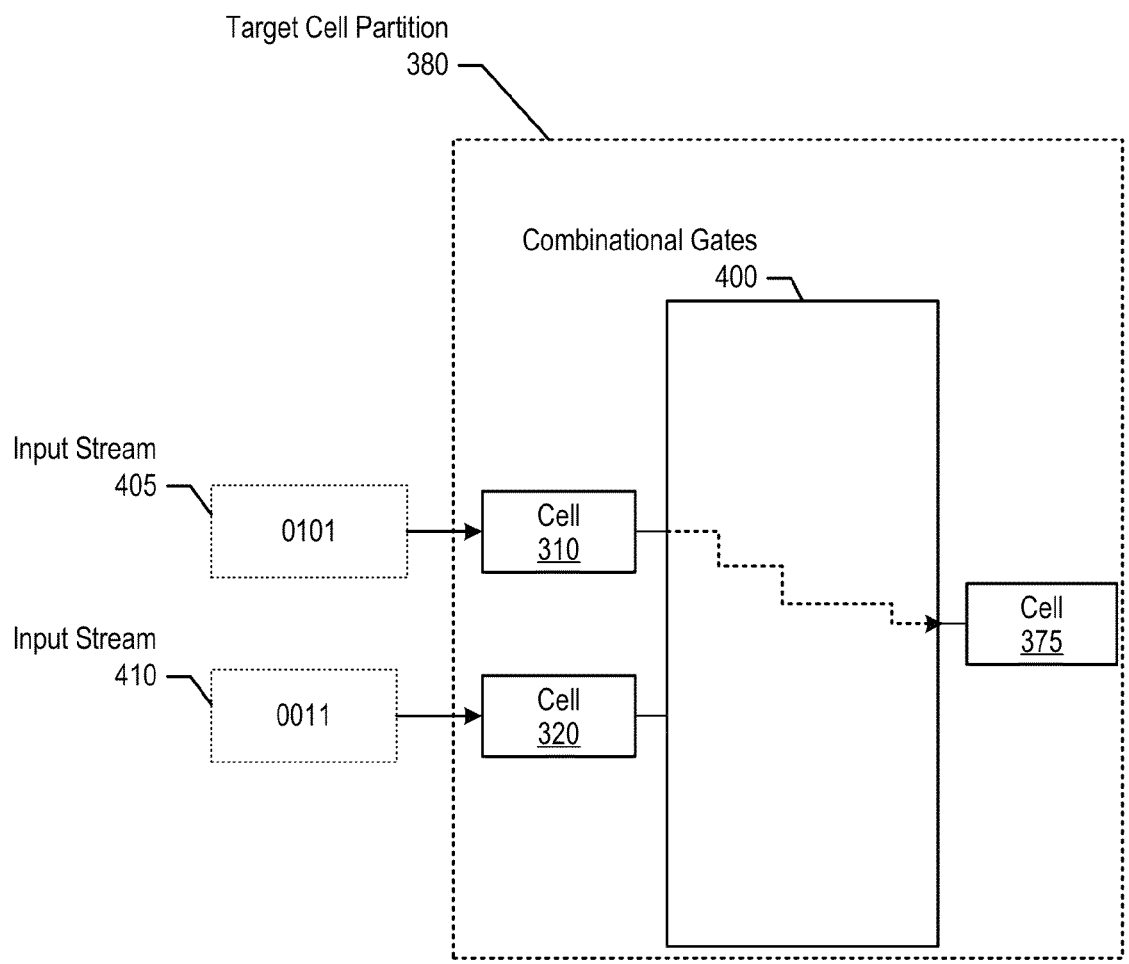
FIG. 4 is a diagram depicting one example of a design tool determining timing modes of a target cell partition netlist.

FIG. 4 is a diagram depicting one example of using digital gate-level simulation to determine timing modes of a target cell partition netlist. FIG. 4 shows that target cell partition 380 includes source sequential cells 310 and 320, target cell 375, and combinational gates 400, which includes gates 330-345 shown in FIG. 3.

Combinational gates 400 is simulated by inputting data streams into source sequential cells 310 and 320 to determine timing modes that affect target sequential cell 375. For one of the source sequential cells (310), a sequence of alternating 0 and 1 states is applied (input stream 405). For the other source sequential cell (320), all the possible combinations of 0 and 1 states are fixed for each toggling low-high-low sequence from input stream 405.

A digital gate level simulation is then performed with these inputs. During the simulation, a transition at target cell 375 indicates a valid timing mode. Furthermore, for each timing mode, intermediate nodes that toggle inside target cell partition 380 are recorded to determine different sets of inputs that exercise the same set of intermediate nodes, in which case only one timing mode is saved for the subsequent circuit level SPICE simulation (see FIG. 9 and corresponding text for further details). This digital gate simulation is then repeated for each of the other inputs.

Although the example shown in FIG. 4 includes two source sequential cells, a target cell partition may have a large number of source sequential cells. Assuming a target cell partition includes N number of source sequential cells, then $2^N$ patterns are required to explore all the possible timing modes. Since digital gate level simulation is relatively fast and inexpensive compared to SPICE simulations, limitations are not placed on the design tool until N becomes rather large, such as N=100. In an embodiment when N is large, the design tool divides the simulation inputs into separate jobs and dispatches separate digital gate-level simulations in parallel to a network of computers (see FIG. 9 and corresponding text for further details).

In another embodiment, timing modes for the target cell partition may be obtained by analyzing logic truth tables for each of the combinational gates in the partition. In yet another embodiment, a binary decision diagram may be used to represent the Boolean logic for the combinational gates in order to determine the timing modes in the partition.

FIG. 5 depicts an example of a timing mode table that includes timing modes of a target cell partition netlist. A timing mode for a target cell partition includes a set of inputs at the source cells in the partition that will enable the voltage value at the data input to the target cell to switch from low to high or from high to low. Table 500 includes two such timing modes. The first timing mode in row 510 is defined by the value at cell 310 set to high, with cell 320 toggling between high and low states. In this case, referring to FIG. 3, when cell 320 is in the low state, the output of AND gate 335 is low, causing the output of NAND gate 345 to be high. When cell 320 toggles to the high state, the output of AND gate 335 toggles high, and output of the NAND gate 345 toggles low. Conversely, if cell 310 is set low, then the output of AND gate 335 will always be low, and the output of NAND gate 345 will always be high, regardless of the state of cell 320. Therefore, table 500 does not include a timing mode when cell 310 is set in the low state.

Table 500's second timing mode is in row 520, which includes fixing cell 320 at a high state, and toggling cell 310 between low and high states. When cell 310 is in the high state, the output of AND gate 335 is high, and the output of NAND gate 345 is low. When cell 310 switches to the low state, the output of AND gate 335 is low and the output of NAND gate 345 is high. Conversely, when cell 320 is fixed to the low state, data cannot flow from cell 310 to cell 375. As discussed in more detail below, the timing modes are subsequently used to set the input stimuli for SPICE circuit simulations.

Note that in the above procedure, individual paths do not need to be traced through the combinational logic. In the first timing mode, with cell 310 set to high and cell 320 toggles, two different paths are enabled through the partition. One path originates at cell 320, traversing gates 335 and 345 to target cell 375. The other path originates at cell 320 and traverses gate 345 to the target cell 375. Since subsequent SPICE simulations capture detailed behavior of the circuit, determining which path is the longest path is not required.

Figure 6:
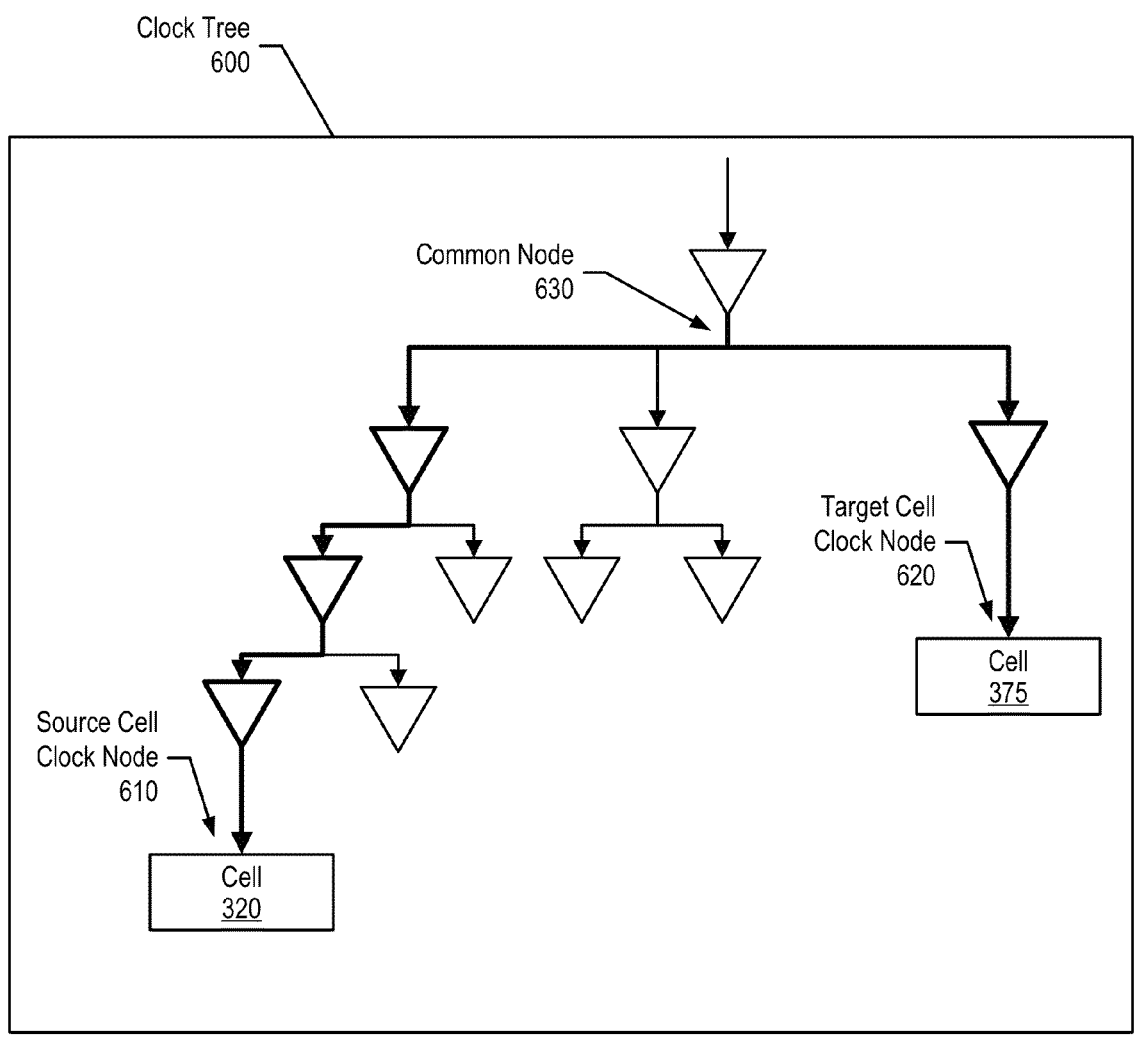
FIG. 6 is a diagram depicting one example of traversing an integrated circuit design's clock tree to define a clock tree partition based upon a particular target cell partition netlist.

FIG. 6 is a diagram depicting one example of traversing an integrated circuit design's clock tree to define a clock tree partition for a particular target cell partition. An important element of a target cell partition's behavior is a periodic clock signal at the source cell and the target cell. For example, many sequential cells are designed to trigger when a rising edge of the clock arrives at the sequential cell. As such, data is released from a source cell when the rising edge of the clock arrives at the source cell and flows along a path through the combinational logic to the target cell. When the rising edge of the target cell's clock signal arrives, the target cell captures the data at the cell input. As such, enhanced timing system module 150 captures details of the clock signals at the sequential cells (target and source) in a target cell partition, including the relative phase of each clock waveform.

Clock tree 600 shows source cell 320 and target cell 375 from FIG. 3. The design tool locates target cell 375's clock node 620, and back traces from clock node 620 to the integrated circuit's primary clock input, making a list of all the nodes visited during the back trace. Next, the design tool locates source cell 320's clock node 610 and begins tracing back to the primary clock input. When the design tool reaches common node 630, the design tool simulates (e.g., SPICE simulation) the partial clock network that includes clock node 610 and clock node 620. The design tool stores one period of the simulated clock waveform at the input of each of the sequential cells in the target cell partition netlist, which ensures full SPICE accuracy for the clock signals pertaining to target cell partition 380 (see FIG. 10 and corresponding text for further details).

Figure 7:
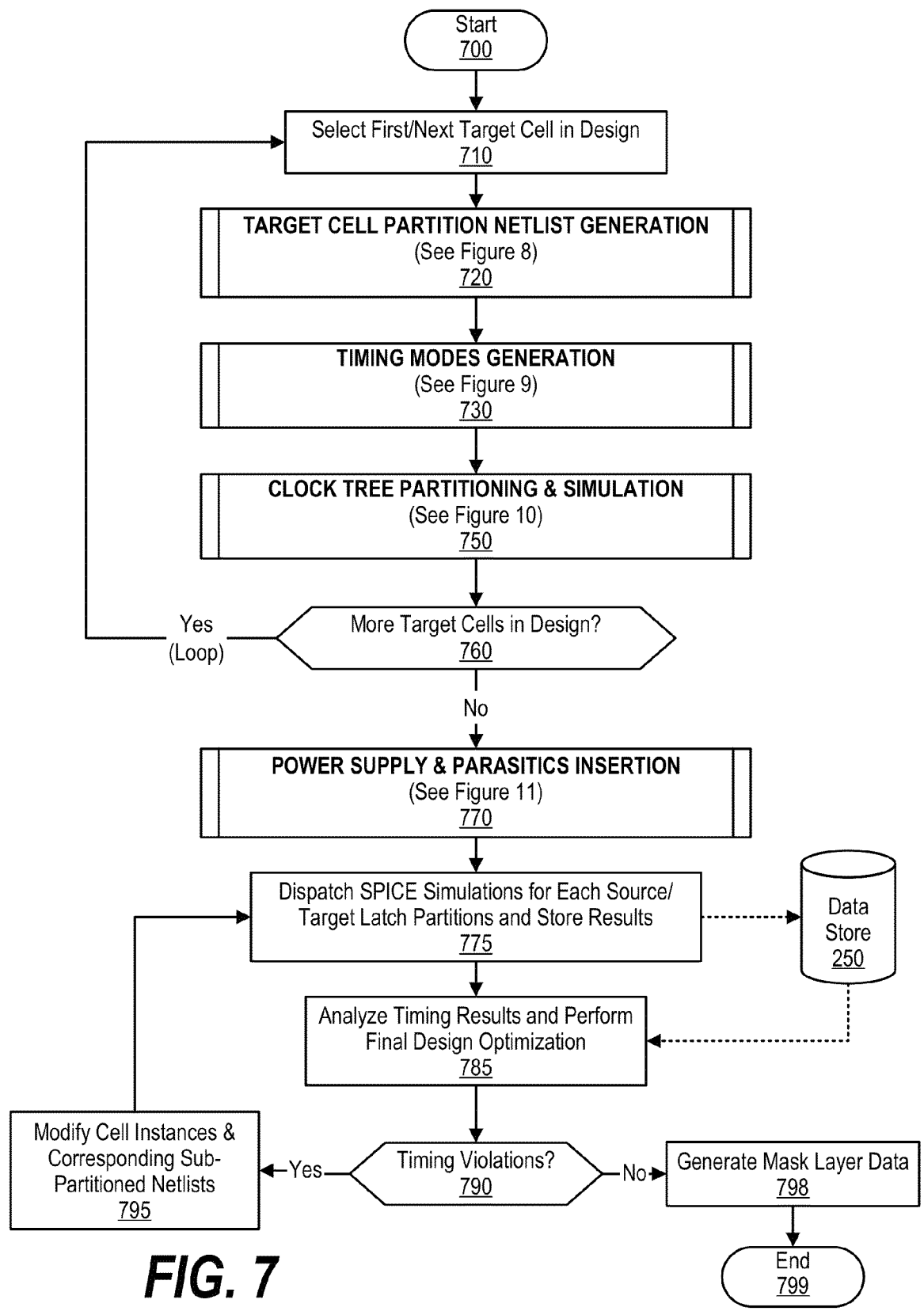
FIG. 7 is a high-level flowchart depicting one example of steps taken by a design tool to partition an integrated circuit design into target cell partition netlists and perform transistor-level circuit simulations on the target cell partition netlists.

FIG. 7 is a high-level flowchart depicting one example of steps taken to partition an integrated circuit design netlist into target cell partition netlists and perform transistor-level circuit simulations on the target cell partition netlists. Processing commences at 700, whereupon the design tool analyzes a gate-level netlist generated from a place and route process, and selects a first target cell in the design, such as cell 375 shown in FIG. 3. The design tool back traces the design from the selected target cell to define a target cell partition, such as target cell partition 380 shown in FIG. 3 (pre-defined process block 720, see FIG. 8 and corresponding text for further details). In one embodiment, the design tool uses a path-tracing algorithm to perform the back tracing, which identifies components in the integrated circuit design that affect the arrival of data at the target cell.

Figure 9:
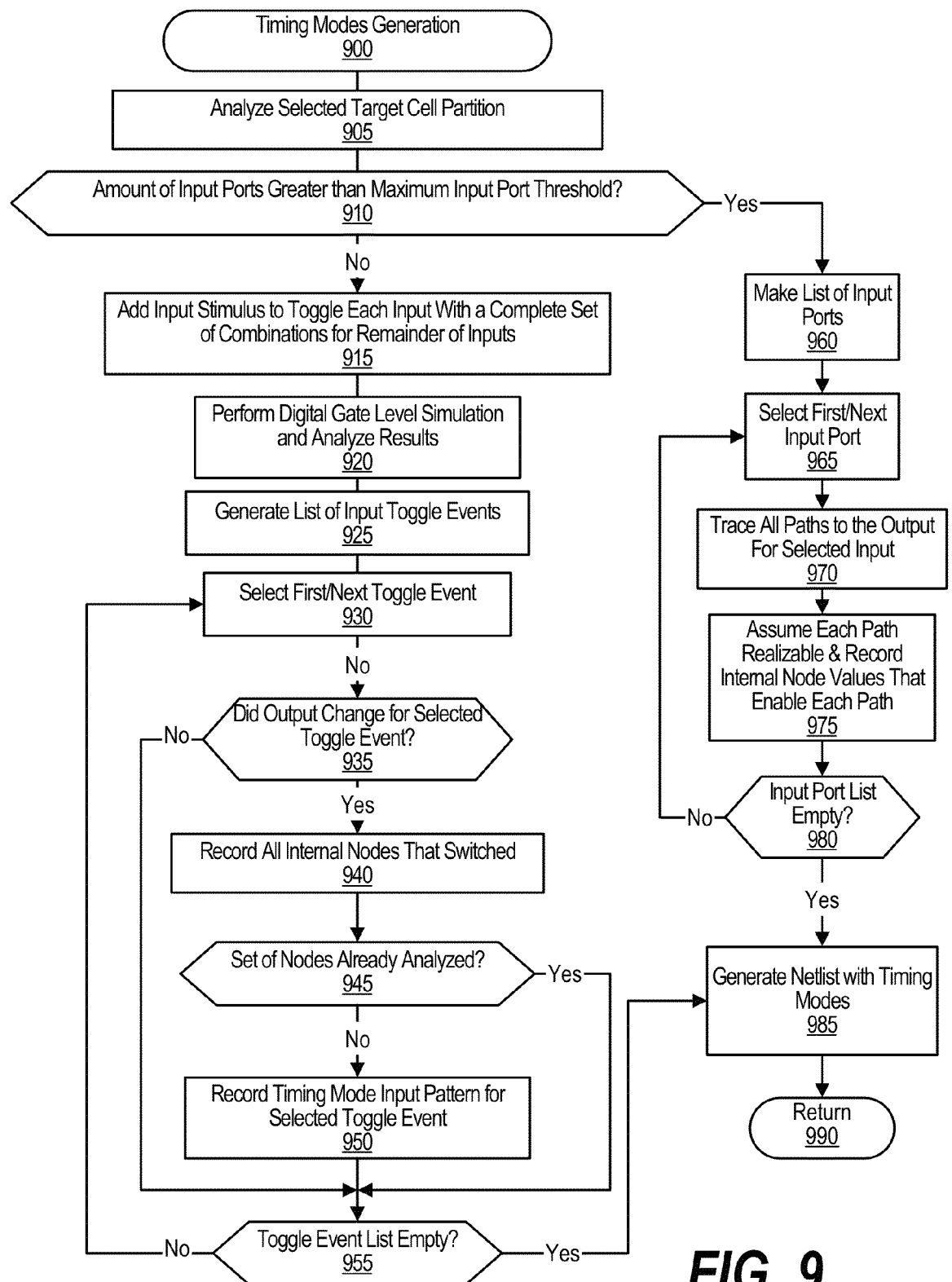
FIG. 9 is a flowchart depicting one example of steps taken by a design tool to determine the timing modes of a target cell partition netlist from a selected source cell to a target cell.

The design tool determines timing modes for the target cell partition netlist, which are modes that allow data transitions at a source cell to cause data transitions (pre-defined process block 730, see FIG. 9 and corresponding text for further details). In one embodiment, the design tool uses digital gate level simulation of the combinational cells in the target cell partition netlist to determine the timing modes. In another embodiment, the design tool may use truth tables of gates included in the target cell partition netlist, or binary decision diagrams, to determine the timing modes of the target cell partition netlist.

Figure 10:
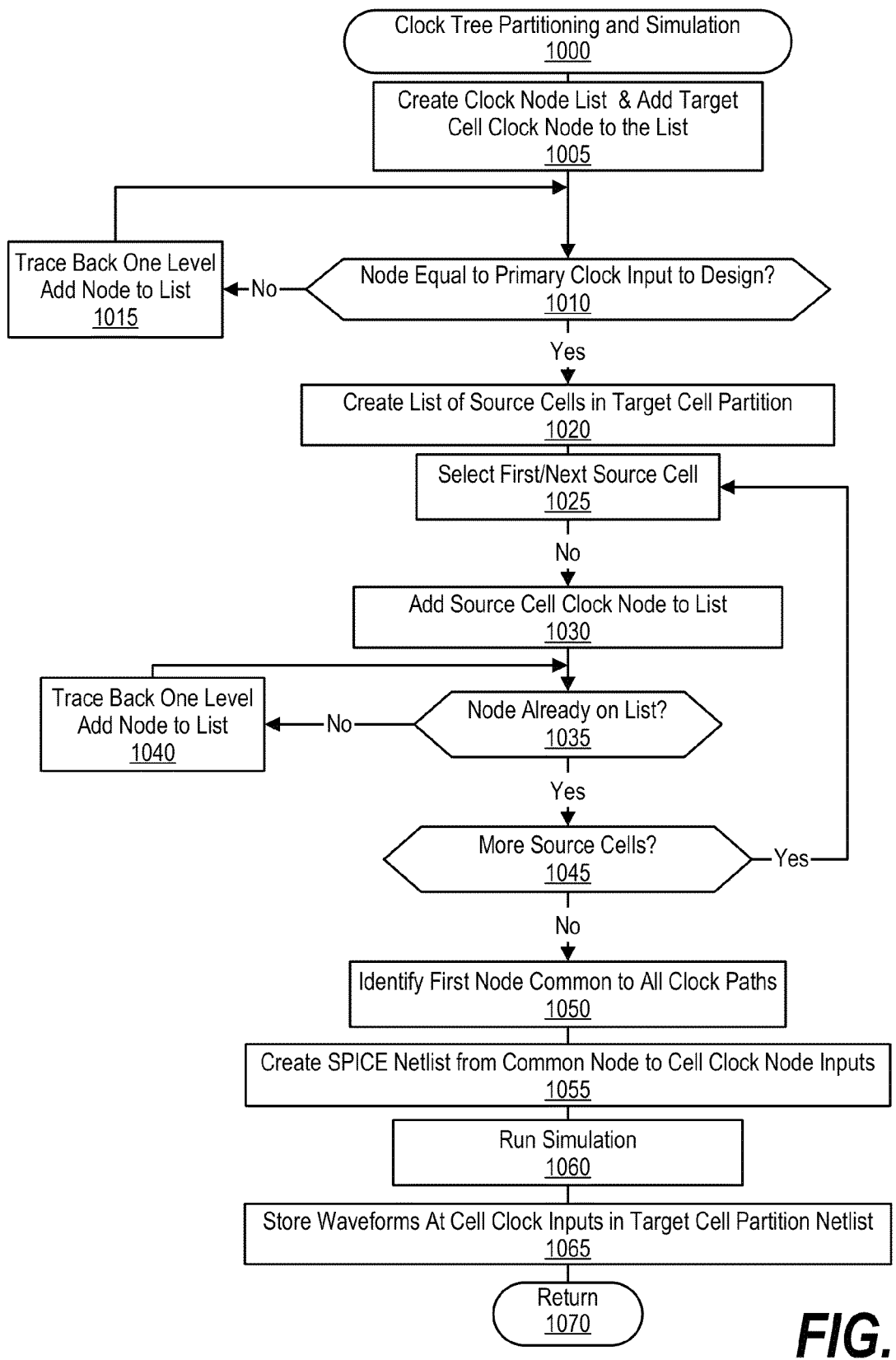
FIG. 10 is a flowchart depicting one example of steps taken by a design tool to create a clock tree partition that corresponds to a target cell partition.

The design tool performs clock tree partitioning and simulation steps to compute delays between source cell clocks and the target cell clock since delays through clock trees have an implication on timing analysis (pre-defined process block 750, see FIG. 10 and corresponding text for further details). Once clock tree partitioning and delay computations are complete for the target cell partition netlist, a determination is made as to whether there are more target cells for which to define a target cell partition netlist (decision 760). If there are more target cells to define a target cell partition netlist, decision 760 branches to the "Yes" branch, which loops back to define and process a second target cell partition netlist. This looping continues until there are no more target cell partition netlists to define, at which point decision 760 branches to the "No" branch.

In one embodiment, power supply values and routing parasitics influence timing values. As such, the design tool inserts voltage supply values and routing parasitic properties into the target cell partition netlists prior to SPICE simulations (pre-defined process block 770, see FIG. 11 and corresponding text for further details). At 775, the design tool dispatches the target cell partition netlists, preferably to multiple computer systems, to concurrently perform independent SPICE simulations. The individual SPICE simulation results are stored in data store 250.

In one embodiment, technology model files used by the SPICE simulator, such as MOSFET models, etc. are included in the target cell partition netlists. In another embodiment, SPICE measurement statements to extract all the information of interest from the simulation, such as setup time, hold time, dynamic and static power dissipation, etc., are inserted in the target cell partition netlists.

In yet another embodiment, target cell partition netlists may be executed at different levels of granularity based upon the available computing environment determined by the design tool. For example, for a given target cell partition netlist, the design tool may perform multiple dispatches each timing mode. In another example, for a different target cell partition netlist, the design tool may perform a single dispatch to handle all of the timing modes for the different target cell partition netlist.

At 785, the design tool analyzes the timing results from the SPICE simulations. If the timing results include timing violations, decision 790 branches to the "Yes" branch, whereupon the design tool modifies cell instances (e.g., larger drive strength cells) at 795 and dispatches modified target cell partition netlists for SPICE simulations. In one embodiment, the design tool may also modify the partial clock tree from 750, such as inserting buffers, changing clock cell drive strengths, etc. In this embodiment, the design tool dispatches the clock tree partition simulations, stores the modified clock waveforms, and re-simulates the target cell partition netlist. When the design tool determines that no timing violations exist, decision 790 branches to the "No" branch, whereupon mask layer data is generated to send to a mask fabrication facility (798), and processing ends at 799.

Figure 8:
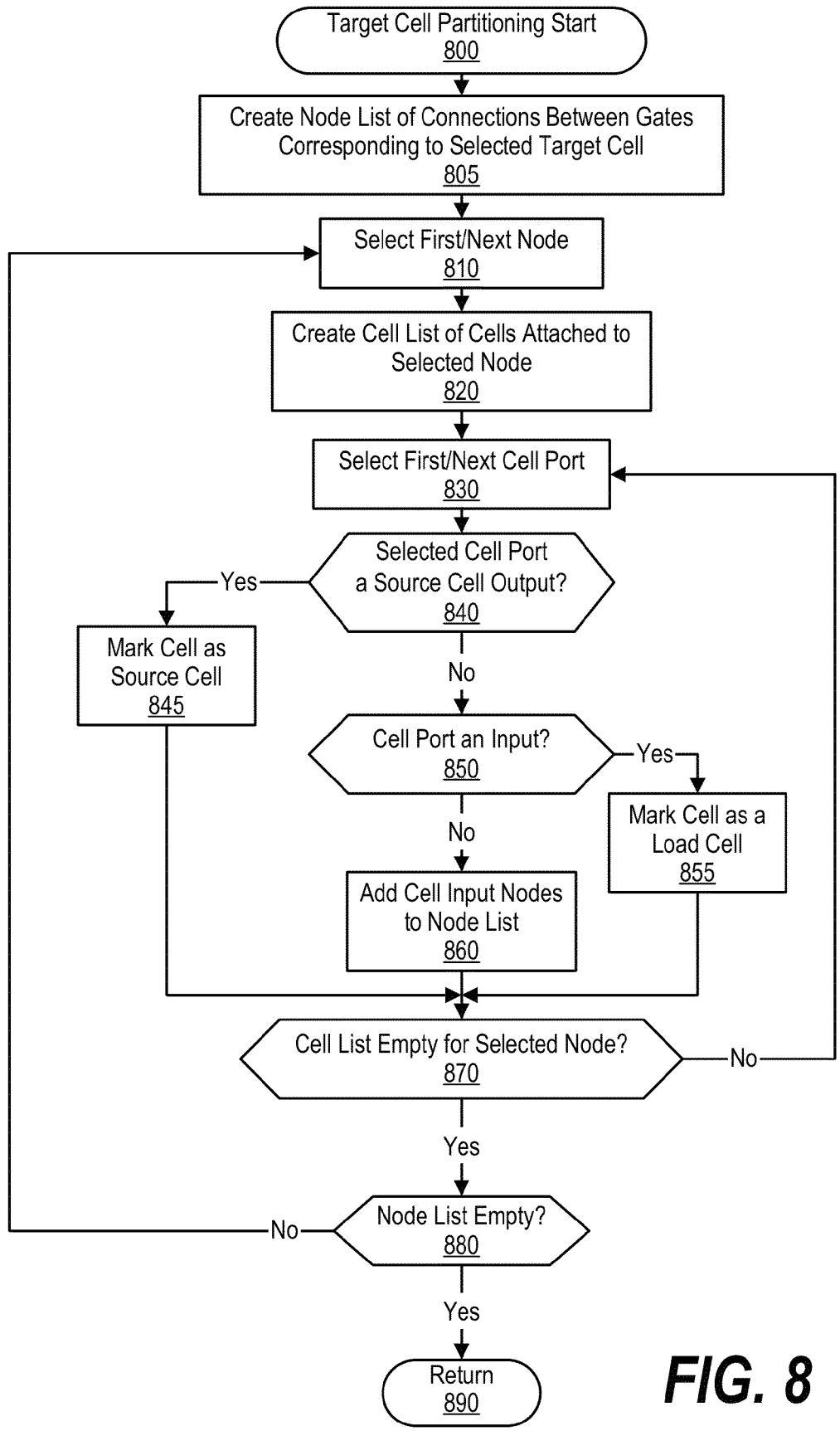
FIG. 8 is a flowchart depicting one example of steps taken by a design tool to generate target cell partitions that correspond to target sequential cells included in a gate-level netlist.

FIG. 8 is a flowchart depicting one example of steps taken to generate target cell partitions by back tracing a design from a target sequential cell to source sequential cells or standard cell inputs.

Processing commences at 800, whereupon the design tool creates an initial node list (805). As described herein, a node is the interconnection between cells, and the initial node list includes connection information between the data input of the selected target cell from FIG. 7 and combinational logic, such as NAND gates, NOR gates, etc., corresponding to the selected target cell. For example, the initial node list corresponding to cell 375 includes the connection between cell 375 and gate 345.

At 810, the design tool selects the first node connected to the data input of the target cell, and a cell list is created that includes a list of cells (logic gates/sequential cells) connected to the node (820). The design tool selects the first cell's port at 830, and a determination is made as to whether the selected cell port is a source cell output (decision 840). If the selected cell port is a source cell output, decision 840 branches to the "Yes" branch, whereupon the cell is marked as a source cell (845).

On the other hand, if the selected cell port is not a source cell output, decision 840 branches to the "No" branch, whereupon a determination is made as to whether the cell port is an input, such as an input to a sequential cell or a logic gate (decision 850). If the cell port is an input, decision 850 branches to the "Yes" branch, whereupon the design tool marks the cell as a load cell at 855. On the other hand, if the cell port is not an input, decision 850 branches to the "No" branch, whereupon the design tool adds input nodes corresponding to the selected cell to the node list at 860 (e.g., back tracing). For example, referring to FIG. 3, when the design tool determines that the node between cell 375 and 345 is not an input or a source cell output, the design tool adds gate 345's input nodes to the node list, which are connections to cell 320, gate 335, and gate 340.

A determination is made as to whether the cell list is empty for the selected node (decision 870). For example, a node may connect to several different sequential cells or gates. If the cell list is not empty, decision 870 branches to the "No" branch, which loops back to select and process the next cell's port. This looping continues until the cell list is empty for the selected node, at which point decision 870 branches to the "Yes" branch.

A determination is made as to whether the node list is empty, indicating that each node has been traced back to source cells or load cells (decision 880). If the node list is not empty, decision 880 branches to the "No" branch, whereupon the design tool selects and processes the next node on the node list, such as to an input node of a cell that was added in 860 above. This looping continues until the node list is empty, thereby defining a target cell partition for the selected target cell, whereupon decision 880 branches to the "Yes" branch and processing returns at 890 to determine the timing modes of the target cell partition (see FIG. 9 and corresponding text for further details).

FIG. 9 is a flowchart depicting one example of steps taken to determine the timing modes of a target cell partition netlist from a selected source cell to a target cell. Processing commences at 900, whereupon the design tool analyzes the selected target cell partition netlist and identifies the source cells and target cell of the target cell partition (905). A determination is made as to whether the number of source cells in the netlist is greater than a maximum input port threshold (decision 910). In one embodiment, the maximum input port threshold is determined by the compute time expected to perform a gate level digital simulation on the combination of all possible input values. For example, if a target cell partition netlist includes N input ports, then approximately $2^N$ input value combinations are needed. At some value of N, such as 100, the design tool may require a substantial amount of time to perform an exhaustive set of digital gate level simulations.

If the amount if source cells is less or equal to than the maximum input port threshold, decision 910 branches to the "No" branch, whereupon the design tool adds input stimulus to toggle each input in the netlist to begin identification of timing modes through the netlist (915). At 920, the design tool performs digital gate level simulation and analyzes the results. Based upon the results, the design tool generates a list of feasible input toggle events (925). For example, in FIG. 4, a digital simulation of the combinational logic gates when the input from cell 310 is fixed to a high state and the input from cell 320 toggles between low and high states produces a toggling signal at the input to cell 375.

The design tool selects the first toggle event at 930, and a determination is made as to whether the target cell output was changed by the selected toggle event (decision 935). If the output did not change, decision 935 branches to the "No" branch, bypassing timing mode recording steps. For example, when the input from cell 310 is fixed to the low state and the input from cell 320 toggles between low and high state, no change at the input to cell 375 is detected and a timing mode is not recorded.

On the other hand, if the output changed, decision 935 branches to the "Yes" branch, whereupon the design tool records the internal nodes that toggled (940). A determination is made as to whether the set of recorded internal nodes has already been analyzed, such as from a different branch (decision 945). If the set of internal nodes was already analyzed, decision 945 branches to the "Yes" branch, bypassing timing mode input pattern steps. If the set of nodes has not yet been analyzed, decision 945 branches to the "No" branch, whereupon the design tool records a timing mode input pattern for the selected toggle event, such as that shown in FIG. 5.

A determination is made as to whether the toggle list is empty (decision 955). If the toggle event list is not empty, decision 955 branches to the "No" branch, which loops back to select and process the next toggle event. This looping continues until the toggle list is empty, at which point decision 955 branches to the "Yes" branch, whereupon the design tool creates a target cell partition netlist that includes valid timing mode input patterns (985). Processing returns at 990.

Referring back to 910, if the amount of input ports is greater than the maximum input port threshold, decision 910 branches to the "Yes" branch, whereupon the design tool makes a list of input ports (960) and selects the first input port at 965. The design tool traces all paths to the output from the selected input at 970, and the design tool assumes that each path is realizable and records internal node values that enable each path (975).

A determination is made as to whether the input port list is empty (decision 980). If the input port list is not empty, decision 980 branches to the "No" branch, which loops back to select and process the next input port. This looping continues until the input port list is empty, at which point decision 980 branches to the "Yes" branch, whereupon the design tool creates a target cell partition netlist that includes valid timing mode input patterns (985). Processing returns at 990.

FIG. 10 is a flowchart depicting one example of steps taken to define a clock tree partition of a selected target cell partition. Processing commences at 1000, whereupon the design tool creates a clock node list and adds a target cell clock node to the node list at 1005. A determination is made as to whether the target cell clock node is equal to a primary clock input to the design (decision 1010). If the target cell clock node is not equal to primary clock input to the design, decision 1010 branches to the "No" branch, whereupon the design tool traces back one level and adds the traced back clock node to the list (1015).

This looping continues until the design tool reaches the primary clock input node, at which point decision 1010 branches to the "Yes" branch, whereupon the design tool creates a list of source cells included in the target cell partition at 1020. The design tool selects the first source cell at 1025, and adds the selected source cell's clock node to the clock node list at 1030. A determination is made as to whether the clock node is already on the node list, such as from the previous back trace of the target cell clock node (decision 1035). If the clock node is not on the list, decision 1035 branches to the "No" branch, whereupon the design tool traces back one level and adds the traced back clock node to the node list (1040). This looping continues until the design tool traces back to a clock node that is on the clock node list, at which point decision 1035 branches to the "Yes" branch, indicating that the clock tree moving backward has already been evaluated from a previous traversal.

A determination is made as to whether there are more source cells in the target cell partition for which to analyze their clock tree paths (decision 1045). If there are more source cells, decision 1045 branches to the "Yes" branch, which loops back to select and process the next source cell. This looping continues until each of source cell's clock trees have been analyzed, at which point decision 1045 branches to the "No" branch.

At 1050, the design tool identifies a first node common to all clock paths (e.g., common node 630 shown in FIG. 6), and creates a SPICE netlist from the common node to the clock inputs of the source cells and the target cell (1055). At 1060, the design tool runs a simulation using the netlist and stores waveforms, which include clock delays, at the clock inputs of the source cells and the target cell in the target cell partition netlist (1065). Processing returns at 1070.

FIG. 11 is a flowchart depicting one example of steps taken to insert accurate power supply voltages and accurate routing parasitic properties into a target cell partition netlist. Processing commences at 1100, whereupon a determination is made as to whether a power grid simulation of the integrated circuit design has been completed (decision 1110). If the power grid simulation is complete, decision 1110 branches to the "Yes" branch, whereupon the design tool uses a power grid simulation report to match voltage supply values to Vdd nodes of standard cell instances in the various target cell partitions (1120). At 1130, the design tool inserts the voltage supply values at the matched Vdd nodes of the standard cell instances into the target cell partition netlists as voltages sources. On the other hand, if the power grid simulation has not been completed, decision 1110 branches to the "No" branch, whereupon the design tool uses ideal voltage supply values for DC sources for each cell in the target cell partition netlists (1140).

A determination is made as to whether routing parasitic properties (resistor/capacitor interconnect information) are available that were generated by place and route system module 140 (decision 1150). If routing parasitic properties are available, decision 1150 branches to the "Yes" branch, whereupon the design tool matches the routing parasitic properties to local nodes in the target cell partition netlists (1160). For example, resistor/capacitor (RC) interconnect information may be included in a Detailed Standard Parasitic File (DSPF) format that contains information that matches the names for each node in the design and breaks the node into a 'net', which is a collection of nodes. Referring to FIG. 3, the wire connecting cell 375 and 345 is a single node at the gate level and when the routing parasitic properties are inserted, the node becomes a set of resistors/capacitors, referred to as a routing parasitic net. In one embodiment, other file format types that include routing parasitic properties may be utilized to embed routing parasitic information into target cell partition netlists.

On the other hand, if the routing parasitic properties are not available, decision 1150 branches to the "No" branch and processing returns at 1180.

According to one embodiment of the present disclosure, a design tool system partitions an integrated circuit gate-level netlist into multiple target cell partition netlists that each includes a target sequential cell. The design tool system performs transistor-level circuit simulations on each of the target cell partition netlists to generate multiple timing simulation results. In turn, the design tool system generates mask layer data in response to the timing simulation results being free from timing violations. The mask layer data is configured to generate masks for construction of an integrated circuit corresponding to the integrated circuit gate-level netlist.

According to another embodiment of the present disclosure, the design tool system matches routing parasitic properties, generated during a place and route stage, to local nodes included in the target cell partition netlists. The design tool system inserts the matched routing parasitic properties into the target cell partition netlists that, in turn, are utilized during the transistor-level circuit simulations. In this embodiment, the local nodes may correspond to wire interconnections between standard cell instances and the routing parasitic properties may correspond to wire loading capacitances, wire loading resistances, or fan out loading.

According to yet another embodiment of the present disclosure, the design tool system back traces from a selected target sequential cell, through combinational logic included in the integrated circuit gate-level netlist, to a source sequential cell. The design tool system, in turn, defines one of the target cell partition netlists as including the selected target sequential cell, the source sequential cell, and the back traced combinational logic.

According to yet another embodiment of the present disclosure, the design tool system defines a clock tree partition corresponding to the integrated circuit gate-level netlist. The clock tree partition includes a target sequential cell clock node corresponding to the target sequential cell and a source sequential cell clock node corresponding to the source sequential cell. The design tool system determines a clock skew between the source sequential cell clock node and the target sequential cell clock node and, in turn, inserts the clock skew into the selected target cell partition netlist for use in the transistor-level circuit simulation.

According to yet another embodiment of the present disclosure, the design tool system matches standard cell instances to voltage supply values that are based upon a power grid simulation corresponding to the integrated circuit design. The design tool system inserts the voltage supply values into the selected target cell partition netlist for use in the transistor-level circuit simulation.

According to yet another embodiment of the present disclosure, the design tool system performs gate-level simulation on a target cell partition netlist by injecting input stimulus to multiple source sequential cells, which generates input toggle events. The design tool system determines timing modes of the target cell partition netlist based upon the generated input toggle events, and utilizes the timing modes during the transistor-level circuit simulation.

According to yet another embodiment of the present disclosure, each of the target cell partition netlists are individually executed by individual SPICE simulators. According to yet another embodiment of the present disclosure, the transistor-level circuit simulations are devoid of using liberty files corresponding to the standard cells included in the integrated circuit design. In this embodiment, the integrated circuit executes under timing margins that are less than the timing margins required by the liberty files.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program, in a non-transitory fashion, for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 12 illustrates information handling system 1200, which is a simplified example of a computer system capable of performing the computing operations described herein. Information handling system 1200 includes one or more processors 1210 coupled to processor interface bus 1212. Processor interface bus 1212 connects processors 1210 to Northbridge 1215, which is also known as the Memory Controller Hub (MCH). Northbridge 1215 connects to system memory 1220 and provides a means for processor(s) 1210 to access the system memory. Graphics controller 1225 also connects to Northbridge 1215. In one embodiment, PCI Express bus 1218 connects Northbridge 1215 to graphics controller 1225. Graphics controller 1225 connects to display device 1230, such as a computer monitor.

Northbridge 1215 and Southbridge 1235 connect to each other using bus 1219. In one embodiment, the bus is a Direct Media Interface (DMI) bus that transfers data at high speeds in each direction between Northbridge 1215 and Southbridge 1235. In another embodiment, a Peripheral Component Interconnect (PCI) bus connects the Northbridge and the Southbridge. Southbridge 1235, also known as the I/O Controller Hub (ICH) is a chip that generally implements capabilities that operate at slower speeds than the capabilities provided by the Northbridge. Southbridge 1235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1296 and "legacy" I/O devices (using a "super I/O" chip). The "legacy" I/O devices (1298) can include, for example, serial and parallel ports, keyboard, mouse, and/or a floppy disk controller. The LPC bus also connects Southbridge 1235 to Trusted Platform Module (TPM) 1295. Other components often included in Southbridge 1235 include a Direct Memory Access (DMA) controller, a Programmable Interrupt Controller (PIC), and a storage device controller, which connects Southbridge 1235 to nonvolatile storage device 1285, such as a hard disk drive, using bus 1284.

ExpressCard 1255 is a slot that connects hot-pluggable devices to the information handling system. ExpressCard 1255 supports both PCI Express and USB connectivity as it connects to Southbridge 1235 using both the Universal Serial Bus (USB) the PCI Express bus. Southbridge 1235 includes USB Controller 1240 that provides USB connectivity to devices that connect to the USB. These devices include webcam (camera) 1250, infrared (IR) receiver 1248, keyboard and trackpad 1244, and Bluetooth device 1246, which provides for wireless personal area networks (PANs). USB Controller 1240 also provides USB connectivity to other miscellaneous USB connected devices 1242, such as a mouse, removable nonvolatile storage device 1245, modems, network cards, ISDN connectors, fax, printers, USB hubs, and many other types of USB connected devices. While removable nonvolatile storage device 1245 is shown as a USB-connected device, removable nonvolatile storage device 1245 could be connected using a different interface, such as a Firewire interface, etcetera.

Wireless Local Area Network (LAN) device 1275 connects to Southbridge 1235 via the PCI or PCI Express bus 1272. LAN device 1275 typically implements one of the IEEE 802.11 standards of over-the-air modulation techniques that all use the same protocol to wireless communicate between information handling system 1200 and another computer system or device. Optical storage device 1290 connects to Southbridge 1235 using Serial ATA (SATA) bus 1288. Serial ATA adapters and devices communicate over a high-speed serial link. The Serial ATA bus also connects Southbridge 1235 to other forms of storage devices, such as hard disk drives. Audio circuitry 1260, such as a sound card, connects to Southbridge 1235 via bus 1258. Audio circuitry 1260 also provides functionality such as audio line-in and optical digital audio in port 1262, optical digital output and headphone jack 1264, internal speakers 1266, and internal microphone 1268. Ethernet controller 1270 connects to Southbridge 1235 using a bus, such as the PCI or PCI Express bus. Ethernet controller 1270 connects information handling system 1200 to a computer network, such as a Local Area Network (LAN), the Internet, and other public and private computer networks.

While FIG. 12 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method for optimizing timing of an integrated circuit design, the method comprising:
   partitioning an integrated circuit gate-level netlist into a plurality of target cell partition netlists, wherein each of the plurality of target cell partition netlists comprises one or more target sequential cells and one or more source sequential cells;
   performing one or more transistor-level circuit simulations on each of the plurality of target cell partition netlists, the one or more transistor-level circuit simulations resulting in a plurality of timing simulation results; and
   generating mask layer data in response to a determination that the plurality of timing simulation results do not generate one or more timing violations, wherein the mask layer data is configured to generate a plurality of masks for construction of an integrated circuit corresponding to the integrated circuit gate-level netlist.

2. The method of claim 1 further comprising:
   matching a plurality of routing parasitic properties to a plurality of local nodes included in the plurality of target cell partition netlists, wherein the plurality of routing parasitic properties were generated in response to a place and route stage of the integrated circuit design; and
   inserting the matched plurality of routing parasitic properties into the plurality of target cell partition netlists, wherein the transistor-level circuit simulation utilizes the routing parasitic properties during the transistor-level circuit simulations.

3. The method of claim 2 wherein the plurality of local nodes correspond to wire interconnections between standard cell instances, and wherein at least one of the plurality of routing parasitic properties are selected from the group consisting of wire loading capacitances, wire loading resistances, and fan out loading.

4. The method of claim 1 wherein the partitioning further comprises:
   selecting one of the one or more target sequential cells;
   back tracing, from the selected target sequential cell, through combinational logic included in the integrated circuit gate-level netlist until reaching the one or more source sequential cells; and
   defining one of the plurality of target cell partition netlists as comprising the selected target sequential cell, the one or more source sequential cells, and the back traced combinational logic.

5. The method of claim 1 further comprising:
   defining a clock tree partition, from a clock tree corresponding to the integrated circuit gate-level netlist, wherein the clock tree partition comprises a target sequential cell clock node corresponding to the target sequential cell and a source sequential cell clock node corresponding to a selected one of the one or more source sequential cells;
   determining a clock skew between the selected source sequential cell clock node and the target sequential cell clock node; and
   inserting the clock skew into the selected target cell partition netlist, wherein the transistor-level circuit simulation utilizes the clock skew during the transistor-level circuit simulation of the selected target cell partition netlist.

6. The method of claim 1 wherein a selected target cell partition netlist comprises a plurality of standard cell instances, the method further comprising:
matching a plurality of voltage supply values to the plurality of standard cell instances, wherein the plurality of voltage supply values are based upon a power grid simulation corresponding to the integrated circuit design; and
inserting the plurality of voltage supply values into the selected target cell partition netlist at the matched plurality of standard cell instances, wherein the transistor-level circuit simulation utilizes the plurality of voltage supply values during the transistor-level circuit simulation of the selected target cell partition netlist.

7. The method of claim 1 further comprising:
selecting one of the plurality of target cell partition netlists;
detecting a plurality of source sequential cells in the selected target cell partition netlist, the one or more source sequential cells included in the plurality of source sequential cells;
performing gate-level simulation on the selected target cell partition netlist by injecting input stimulus to each of the plurality of source sequential cells, wherein the gate-level simulation generates one or more input toggle events;
determining one or more timing modes of the target cell partition netlist based upon the generated one or more input toggle events; and
utilizing the one or more timing modes during the transistor-level circuit simulation of the selected target cell partition netlist.

8. The method of claim 1 wherein each of the plurality of target cell partition netlists are individually executed by one of a plurality of SPICE simulators.

9. The method of claim 1 wherein:
the integrated circuit design utilizes a plurality of standard cells; and
the transistor-level circuit simulation is devoid of using one or more liberty files corresponding to the plurality of standard cells.

10. The method of claim 9 wherein the integrated circuit executes under one or more timing margins that are less than one or more corresponding timing margins required by the one or more liberty files.

11. A system comprising:
one or more processors;
a memory accessible by the one or more processors;
a design tool system executed by at least one of the one or more processors and configured to:
partition an integrated circuit gate-level netlist into a plurality of target cell partition netlists, wherein each of the plurality of target cell partition netlists comprises one or more target sequential cells and one or more source sequential cells;
perform one or more transistor-level circuit simulations on each of the plurality of target cell partition netlists, the one or more transistor-level circuit simulations resulting in a plurality of timing simulation results; and
generate mask layer data in response to a determination that the plurality of timing simulation results do not generate one or more timing violations, wherein the mask layer data is configured to generate a plurality of masks for construction of an integrated circuit corresponding to the integrated circuit gate-level netlist.

12. The system of claim 11 wherein the design tool system is further configured to:
match a plurality of routing parasitic properties to a plurality of local nodes included in the plurality of target cell partition netlists, wherein the plurality of routing parasitic properties were generated in response to a place and route stage of the integrated circuit design; and
insert the matched plurality of routing parasitic properties into the plurality of target cell partition netlists, wherein the transistor-level circuit simulation utilizes the routing parasitic properties during the transistor-level circuit simulations.

13. The system of claim 12 wherein the plurality of local nodes correspond to wire interconnections between standard cell instances, and wherein at least one of the plurality of routing parasitic properties are selected from the group consisting of wire loading capacitances, wire loading resistances, and fan out loading.

14. The system of claim 11 wherein the design tool system is further configured to:
select one of the one or more target sequential cells;
back trace, from the selected target sequential cell, through combinational logic included in the integrated circuit gate-level netlist until reaching the one or more source sequential cells; and
define one of the plurality of target cell partition netlists as comprising the selected target sequential cell, the one or more source sequential cells, and the back traced combinational logic.

15. The system of claim 11 wherein the design tool system is further configured to:
define a clock tree partition, from a clock tree corresponding to the integrated circuit gate-level netlist, wherein the clock tree partition comprises a target sequential cell clock node corresponding to the target sequential cell and a source sequential cell clock node corresponding to a selected one of the one or more source sequential cells;
determine a clock skew between the selected source sequential cell clock node and the target sequential cell clock node; and
insert the clock skew into the selected target cell partition netlist, wherein the transistor-level circuit simulation utilizes the clock skew during the transistor-level circuit simulation of the selected target cell partition netlist.

16. The system of claim 11 wherein a selected target cell partition netlist comprises a plurality of standard cell instances, and wherein the design tool system is further configured to:
match a plurality of voltage supply values to the plurality of standard cell instances, wherein the plurality of voltage supply values are based upon a power grid simulation corresponding to the integrated circuit design; and
insert the plurality of voltage supply values into the selected target cell partition netlist at the matched plurality of standard cell instances, wherein the transistor-level circuit simulation utilizes the plurality of voltage supply values during the transistor-level circuit simulation of the selected target cell partition netlist.

17. The system of claim 11 wherein the design tool system is further configured to:
select one of the plurality of target cell partition netlists;
detect a plurality of source sequential cells in the selected target cell partition netlist, the one or more source sequential cells included in the plurality of source sequential cells;
perform gate-level simulation on the selected target cell partition netlist by injecting input stimulus to each of the plurality of source sequential cells, wherein the gate-level simulation generates one or more input toggle events;

determine one or more timing modes of the target cell partition netlist based upon the generated one or more input toggle events; and utilize the one or more timing modes during the transistor-level circuit simulation of the selected target cell partition netlist.

18. The system of claim 11 wherein each of the plurality of target cell partition netlists are individually executed by one of a plurality of SPICE simulators.

19. The system of claim 11 wherein:

the integrated circuit design utilizes a plurality of standard cells;

the transistor-level circuit simulation is devoid of using one or more liberty files corresponding to the plurality of standard cells; and the integrated circuit executes under one or more timing margins that are less than one or more corresponding timing margins required by the one or more liberty files.

20. A computer program product stored in a computer readable storage medium, comprising computer program code that, when executed by an information handling system, causes the information handling system to perform actions comprising:

partitioning an integrated circuit gate-level netlist into a plurality of target cell partition netlists, wherein each of the plurality of target cell partition netlists comprises one or more target sequential cells and one or more source sequential cells;

performing one or more transistor-level circuit simulations on each of the plurality of target cell partition netlists, the one or more transistor-level circuit simulations resulting in a plurality of timing simulation results; and generating mask layer data in response to a determination that the plurality of timing simulation results do not generate one or more timing violations, wherein the mask layer data is configured to generate a plurality of masks for construction of an integrated circuit corresponding to the integrated circuit gate-level netlist.

* * * * *